(12) United States Patent
Ritter et al.

(10) Patent No.: US 9,135,319 B2
(45) Date of Patent: Sep. 15, 2015

(54) SYSTEM AND METHOD FOR EXECUTING TRANSFORMATION RULES

(75) Inventors: Gerd M. Ritter, Heidelberg (DE); Frank Brunswig, Heidelberg (DE)

(73) Assignee: SAP SE, Walldorf (DE)

( * ) Notice: Subject to any disclaimer, the term of this patent is extended or adjusted under 35 U.S.C. 154(b) by 302 days.

(21) Appl. No.: 12/980,170

(22) Filed: Dec. 28, 2010

(65) Prior Publication Data
US 2012/0166459 A1 Jun. 28, 2012

(51) Int. Cl.
*G06F 17/30* (2006.01)
*G06Q 10/00* (2012.01)

(52) U.S. Cl.
CPC .... *G06F 17/30569* (2013.01); *G06F 17/30896* (2013.01); *G06F 17/30914* (2013.01); *G06Q 10/00* (2013.01)

(58) Field of Classification Search
USPC ......................................................... 707/756
See application file for complete search history.

(56) References Cited

U.S. PATENT DOCUMENTS

| | | | |
|---|---|---|---|
| 6,961,760 B2 * | 11/2005 | Li et al. ........................ | 709/219 |
| 7,013,426 B1 * | 3/2006 | Ingersoll ...................... | 715/209 |
| 7,146,399 B2 * | 12/2006 | Fox et al. ..................... | 709/203 |
| 7,315,853 B2 | 1/2008 | Brunswig et al. | |
| 7,454,660 B1 | 11/2008 | Kolb et al. | |
| 7,480,920 B2 | 1/2009 | Brendle et al. | |
| 7,487,512 B2 | 2/2009 | Brunswig et al. | |
| 7,533,103 B2 | 5/2009 | Brendle et al. | |
| 7,536,673 B2 | 5/2009 | Brendle et al. | |
| 7,565,376 B2 | 7/2009 | Stegmann et al. | |
| 7,624,340 B2 | 11/2009 | Ritter | |
| 7,630,969 B2 | 12/2009 | Ritter | |
| 7,676,816 B2 | 3/2010 | Brunswig et al. | |
| 7,680,783 B2 | 3/2010 | Ritter et al. | |
| 7,685,114 B2 | 3/2010 | Brunswig et al. | |
| 7,685,268 B2 | 3/2010 | Brunswig et al. | |
| 7,685,568 B2 | 3/2010 | Brendle et al. | |
| 7,689,904 B2 | 3/2010 | Ritter | |
| 7,698,174 B2 | 4/2010 | Brunswig et al. | |
| 7,702,650 B2 | 4/2010 | Brunswig et al. | |
| 7,725,907 B2 | 5/2010 | Bloching et al. | |
| 7,765,494 B2 | 7/2010 | Brunswig et al. | |
| 7,769,821 B2 | 8/2010 | Brunswig et al. | |
| 7,770,146 B2 | 8/2010 | Brunswig et al. | |
| 7,774,463 B2 | 8/2010 | Bloching et al. | |
| 7,778,965 B2 | 8/2010 | Bindewald et al. | |
| 7,797,370 B2 | 9/2010 | Brunswig et al. | |
| 7,797,450 B2 * | 9/2010 | Xie et al. ..................... | 709/246 |
| 7,801,996 B2 | 9/2010 | Brunswig et al. | |
| 7,810,102 B2 | 10/2010 | Brendle et al. | |
| 7,840,944 B2 | 11/2010 | Brunswig et al. | |
| 7,844,615 B2 | 11/2010 | Brunswig et al. | |
| 8,112,472 B2 * | 2/2012 | Betts et al. .................... | 709/203 |
| 2004/0088370 A1 * | 5/2004 | Patel et al. .................... | 709/217 |
| 2004/0267704 A1 * | 12/2004 | Subramanian et al. ......... | 707/3 |

(Continued)

*Primary Examiner* — Richard Bowen
(74) *Attorney, Agent, or Firm* — Fish & Richardson P.C.

(57) ABSTRACT

The present disclosure is directed to executing transformation rules. In some implementations, a method includes receiving a request to apply a predefined transformation rule to a portion of a service. In response to at least the request, the predefined transformation rule is identified from a plurality of predefined transformation rules included in a business model. Each of the plurality of predefined transformation rules are configured to update at least one service independent of generating code in a service layer. The predefined transformation rule is assigned to the portion of the service.

10 Claims, 8 Drawing Sheets

(56) References Cited

U.S. PATENT DOCUMENTS

| | | | |
|---|---|---|---|
| 2005/0050068 A1* | 3/2005 | Vaschillo et al. | 707/100 |
| 2005/0154674 A1* | 7/2005 | Nicholls et al. | 705/43 |
| 2005/0154695 A1* | 7/2005 | Gonzalez et al. | 707/1 |
| 2005/0160361 A1* | 7/2005 | Young | 715/513 |
| 2006/0085243 A1* | 4/2006 | Cooper et al. | 705/8 |
| 2006/0130008 A1* | 6/2006 | Nguyen et al. | 717/136 |
| 2006/0136601 A1* | 6/2006 | Arora et al. | 709/246 |
| 2006/0259954 A1* | 11/2006 | Patrick | 726/2 |
| 2007/0061431 A1 | 3/2007 | Brunswig et al. | |
| 2007/0073702 A1 | 3/2007 | Brunswig et al. | |
| 2007/0100943 A1 | 5/2007 | Brunswig et al. | |
| 2007/0124740 A1 | 5/2007 | Brunswig et al. | |
| 2007/0157167 A1 | 7/2007 | Brendle et al. | |
| 2007/0226751 A1 | 9/2007 | Brendle et al. | |
| 2007/0255697 A1* | 11/2007 | Seeman | 707/3 |
| 2008/0005623 A1* | 1/2008 | Said | 714/46 |
| 2008/0010074 A1 | 1/2008 | Brunswig et al. | |
| 2008/0120597 A1 | 5/2008 | Brunswig et al. | |
| 2008/0147455 A1 | 6/2008 | Brunswig et al. | |
| 2008/0148166 A1 | 6/2008 | Brunswig et al. | |
| 2008/0154854 A1 | 6/2008 | Ritter | |
| 2008/0154948 A1 | 6/2008 | Stegmann | |
| 2008/0244616 A1 | 10/2008 | Brunswig et al. | |
| 2008/0255865 A1 | 10/2008 | Ritter et al. | |
| 2008/0301162 A1* | 12/2008 | Wall et al. | 707/101 |
| 2009/0019424 A1 | 1/2009 | Klein et al. | |
| 2009/0132415 A1* | 5/2009 | Davis et al. | 705/43 |
| 2009/0150473 A1 | 6/2009 | Brunswig et al. | |
| 2009/0228490 A1* | 9/2009 | Faenger | 707/10 |
| 2009/0319981 A1* | 12/2009 | Akkiraju et al. | 717/104 |
| 2010/0161629 A1* | 6/2010 | Palanisamy et al. | 707/756 |
| 2010/0217737 A1* | 8/2010 | Shama | 706/47 |
| 2011/0167035 A1* | 7/2011 | Kesel et al. | 707/602 |
| 2012/0130704 A1* | 5/2012 | Lee et al. | 704/3 |

* cited by examiner

SYSTEM AND METHOD FOR EXECUTING TRANSFORMATION RULES

TECHNICAL FIELD

This disclosure relates to business applications and, more particularly, a system and method for executing transformation rules.

BACKGROUND

Data types exposed by a Business Object Model (BO model), such as those exposed by an application, may not comply with requirements of service consumers in a solution (e.g., User Interfaces (UIs), Forms, Composites, Excel UIs). In cases where a data type does not match a solution, the required data type may be exposed by wrapping additional code into the service consumer layer, which introduces differing data types. In other words, the fields of the BO model may have a data type that differs from the data type consumed by the solution (e.g., UI). For example, a validity period in a BO may have a data type representing a time stamp while the validity period in a UI may have a data type representing an age. As a result of the differing data types, new entities in the repository are created if the fields are wrapped by coding. These data type transformations are often manually calculated by the developer such that the relationship between the original data type and the new data type is hidden in the coding.

SUMMARY

The present disclosure is directed to executing transformation rules. In some implementations, a method includes receiving a request to apply a predefined transformation rule to a portion of a service. In response to at least the request, the predefined transformation rule is identified from a plurality of predefined transformation rules included in a business model. Each of the plurality of predefined transformation rules are configured to update at least one service independent of generating code in a service layer. The predefined transformation rule is assigned to the portion of the service.

The details of at least one implementation are set forth in the accompanying drawings and the description below. Other features, objects, and advantages of the implementations will be apparent from the description and drawings, and from the claims.

DESCRIPTION OF DRAWINGS

Like reference symbols in the various drawings indicate like elements.

DETAILED DESCRIPTION

Figure 1:
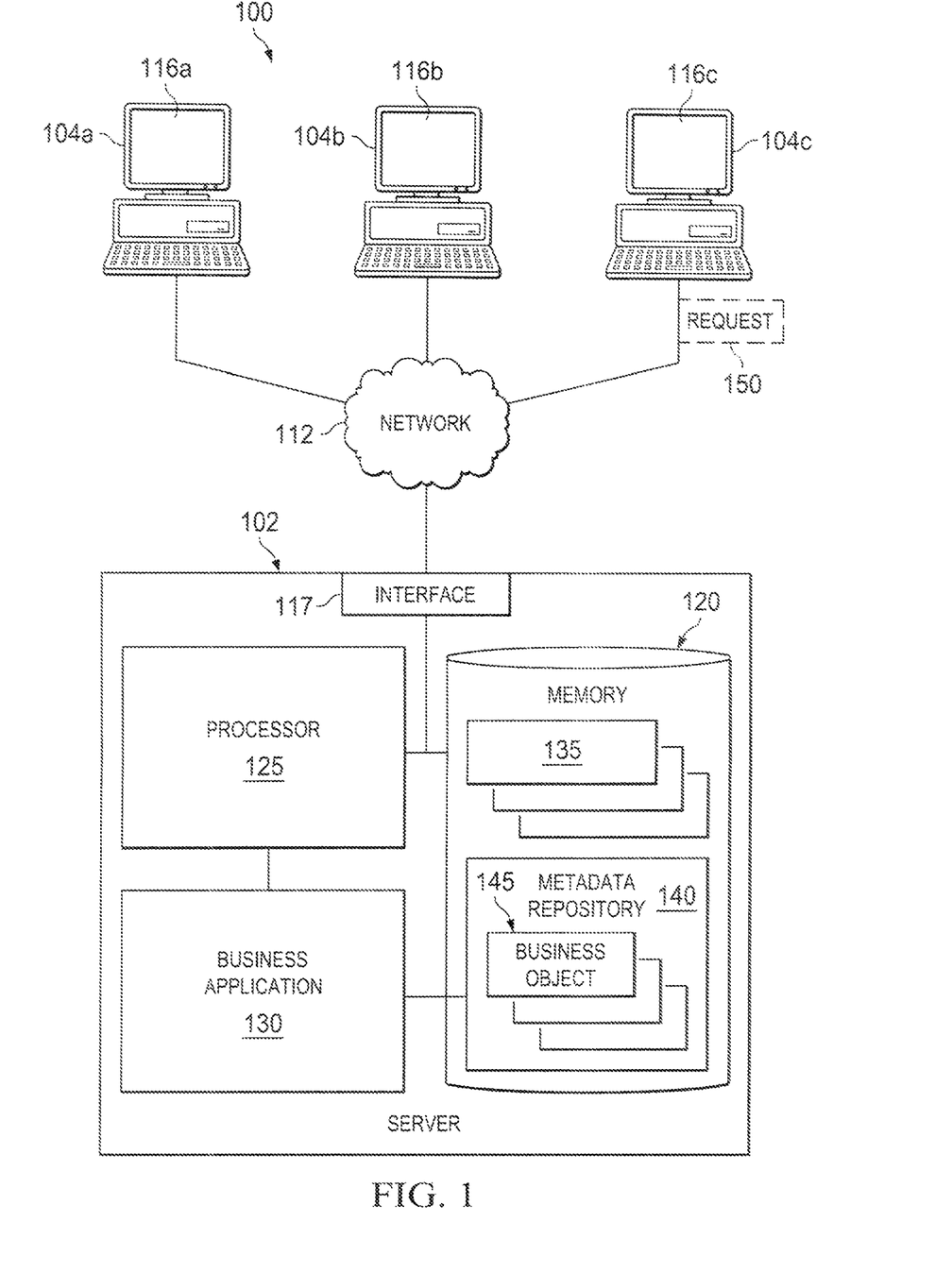
FIG. 1 is a bock diagram illustrating an example service system.

FIG. 1 illustrates a service system 100 for executing predefined transformation rules in connection with consumer services. For example, the system 100 may execute a predefined transformation rule that operates, modifies, or otherwise processes data and/or methods associated with a model and includes the processed attribute in at least one service provided by an application. A consumer service may be a user interface, a web service provider, a download (e.g., form), integration (e.g., a data exchange), and/or other consumer services provided by at least one applications, and a model may include a Business Object (BO) model and/or a business data model such as Extensible Markup Language (XML) Schema Definition (XSD). In some implementations, the predefined transformation rules can be a part of the model (e.g., BO model, business data model) and can be reused on a plurality of different fields (or methods) of the model. In other words, the system 100 may execute a predefined transformation rule for each of a plurality of different consumer services and/or different types of consumer services. When executing the predefined transformation rules, a developer may use these rules on existing fields (or existing methods) of a model for User Interfaces (UI), forms, and/or other service consumers. For example, the predefined transformation rule may modify an existing data field or method of a model and incorporate the updated element in consumer service of an application such as a UI. In some instances, the system 100 may execute a predefined transformation rule to change a first data type (e.g., date of birth) to a second data type (e.g., age) and incorporate the updated data into, for example, a UI. In addition, the system 100 may include reversible predefined transformation rules such that the metadata relation between, for example, UI fields and the underlying application model is known, maintained, or otherwise identifiable. In these instances, the system 100 may execute the transformation rules in each direction such as an entry in a UI field may be converted to a data type compatible with the application model and vice versa. By predefining transformation rules, the system 100 may include at least one of the following: executing these rules during usage of an application field and/or method independent of generating a new entry in a BO or a new BO for a model; reusing the predefined transformation rules in a model independent of writing additional code; reusing for multiple fields and/or service consumers (UI, A2X etc.) independent from the usage; executing these rules transparent to consumers; and/or others. Referring to transparency, the consumers may not be aware that the derived fields are not a part of the model but are "transient" on applying the transformation rules to existing fields.

At a high level, the system 100 includes a server 102 communicably coupled to a plurality of clients 104a-c through a network 112. The user devices 102 are electronic devices that are owned, operated or otherwise associated with a user and operable to at least receive access to services from the server 102. The server 104 is an electronic device operable to process service request, process business objects in response to service requests, execute predefined transformation rules using the business objects, and provide the requested consumer services using the fields and/or methods updated by at least one rule. The server 104 includes memory 120 and a processor 125. The memory 120 stores predefined transformation rules 135 for identifying rules for transforming fields and/or methods of business objects and metadata repository 140 for identifying metadata as well as business objects 145. The processor 125 executes the business application 145. The business application 145 processes service requests including request for services based on the transformation rules 135 and business objects 145. At a high level of operation, the business application 145 may receive a service request from the user device 104 and identify at least one business object 145 and at least one transformation rule 135 based, at least in part, on the services request. In connection with providing the service, the business application 130 may update or otherwise modify a field and/or method of the identified business object 145 using the identified transformation rule 135. The business application 130 may generate the consumer service including the modified business element or otherwise incorporate the modified business element in the requested consumer service.

Turning to the illustrated implementation, system 100 may be a distributed client/server system that allows clients 104 to submit requests to store and/or retrieve information from metadata repository 140 maintained within memory 120 on server 102. But system 100 may also be a standalone computing environment or any other suitable environment, such as an administrator accessing data stored on server 102, without departing from the scope of this disclosure. System 100 may allow access to individual business objects 145 within the metadata repository 140 using access methods such as Java, COM/DCOM (Component Object Model/Distributed Component Object Model), CORBA (Common Object Request Broker Architecture), RFC (Remote Function Call), and Hypertext Transfer Protocol (HTTP), or other suitable access methods.

As for a more detailed description of the illustrated implementation, the server 102 includes memory 120 and processor 125 and comprises an electronic computing device operable to receive, transmit, process and store data associated with system 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel or Linux/390, UNIX, Windows Server, or any other suitable operating system. According to one implementation, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this implementation, illustrated memory 120 includes transformation rules 135 and metadata repository 140. The transformation rules 135 may include any parameters, variables, algorithms, instructions, rules, objects and/or other directives for accessing data such as reading or modifying fields and/or methods of business objects 145. For example, transformation rules 135 may be used to transform a data type of a BO field to a different data type, which is then included in a consumer service through, for example, a UI. In some implementations, the transformation rules 135 may include mathematical expressions and/or logical expressions. For example, the transformation rule 135 may include a mathematical expression that computes at least one result based on at least one data field and/or method included in the BO 145. Alternatively or in combination, the transformation rule 135 may define criteria in a logical expression for evaluating fields in the BO object 145 and/or derived fields. In this case, transformation rules 135 may be used to determined fields and/or derived fields that satisfy identified criteria. For example, the transformation rule 135 may include expressions that determine at least one of the following: derive GermanCountryIndicator to be used in radio-button display from a multi-valued field with type Country-Code; derive ContractValidIndicator to be used as indicator in UI with type GDT_GLOBAL_DATE_TIME being a timestamp (that is active/inactive Indicator for time dependency, Transformation of validity plus current date); display of Dates/Periods without Time and/or timezone; clustering of multiple code values to a single indicator (aggregated status); and/or others. In some implementations, the transformation rules 135 may include an input interface that matches the field(s) data types of the associated BO 145. In some implementations, the predefined transformation rules 135 may define the metadata relation of input- and output parameters, and this information and the metadata relation of the output fields to the underlying model may be transparent to consumers and/or the framework when executing the application. In addition, the relationship of the concrete field values may be transparent to the consumer. For example, the fields exposed in Global Descriptor Table (GDT) may be new data types (also GDTs) and may be used by the service consumer just as fields of the underlying model. A field used directly from the service consumer or this field as the output of a transformation may be transparent for the consumer. In some instances, these transformed elements may be derived from the data type (GDT/CDT, and its Representation term) of the underlying application field—a derived attribute, which may implicitly be a part of the model independent manual creation. Parameters exposed to the service consumer by the transformation rules may be typed as well as already in the definition of the reusable transformation rule. In these instances, a derived data type may not be included but declared in the generic transformation rule itself. The type of the new attribute can typically be derived from the metadata describing the parameter of the transformation rule. Another example may include mapping of error messages, for example, the service provider may expose "Customer 456 cannot be changed due to status blocked", and the service consumer may receive after transformation "Account Kate Jacob is in status blocked; it cannot be changed."

In some implementations, the metadata repository 140 may be stored in at least one tables in a relational database described in terms of SQL statements or scripts. In the same or other implementations, the metadata repository 140 may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or at least one library. In short, the metadata repository 140 may comprise one table or file or a plurality of tables or files stored on one computer or across a plurality of computers in any appropriate format. Indeed, some or the entire metadata repository 140 may be local or remote without departing from the scope of this disclosure and store any type of appropriate data. In particular implementations, the metadata repository 140 may access the business objects 145 in response to queries from clients 104.

These business objects 145 may represent organized data relating to some project or endeavor, which may or may not be linked, with each object having at least one state related to the object. Each of the states, in turn, may be associated with data that pertains to various modifiable parameters of the individual states of the object. One type of data modeling that includes multiple objects with each having multiple states, and each state having multiple instances of changes to the state's modifiable parameters is the business object model. The overall structure of a business object model ensures the consistency of the interfaces that are derived from the business object model. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some implementations, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can, in some implementations, be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

In one implementation, metadata repository 140 may be referenced by or communicably coupled with applications executing on or presented to client 104. In some implementations, the metadata repository 140 may be searchable, such as by requests 150 from clients 104 via the network 112. Distinct business objects 145, as well as multiple instances of a single business object 145, may be searched to allow the user and/or application to find a type of a business object 145 or a specific instance thereof on demand.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). In particular, processor 125 performs any suitable tasks associated with metadata repository 140. Although FIG. 1 illustrates a single processor 125 in server 102, multiple processors 125 may be used according to particular needs and reference to processor 125 is meant to include multiple processors 125 where applicable.

Server 102 may also include interface 117 for communicating with other computer systems, such as client 104, over network 112 in a client-server or other distributed environment. In certain implementations, server 102 receives requests 150 for data access from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting at least one communications protocol associated with communications network 112 or hardware operable to communicate physical signals.

Server 102 may also include or reference a local, distributed, or hosted business application 130. At a high level, business application 130 is any application, program, module, process, or other software that may access, retrieve, modify, delete, or otherwise manage some information of the metadata repository 140 in memory 120. Specifically, business application 130 may access the metadata repository 140 to retrieve or modify data stored within specific business objects 145 as requested by a user and/or another application. Business application 130 may be considered business software or solution that is capable of interacting or integrating with metadata repository 140 located, for example, in memory 120 to provide access to data for personal or business use. An example business application 130 may be a computer application for performing any suitable business process by implementing or executing a plurality of steps. One example of a business application 130 is an application that may provide interconnectivity with business object repository 140 containing product development information such that records may be dispersed among a plurality of business objects 145. As a result, business application 130 may provide a method of accessing requested data and presenting it to the user and/or application such that the user and/or application are provided information through a GUI interface 116 in a centralized manner. Business application 130 may also provide the user with a computer implementable method of implementing a centralized source for agreements on at least one solution identified by a solution provider.

More specifically, business application 130 may be a composite application, or an application built on other applications that include an object access layer (OAL) and a service layer. In this example, application 130 may execute or provide a number of application services, such as CRM systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 130 to orchestrate a business process in synchronization with other existing processes (e.g., native processes of enterprise base systems) and leverage existing investments in the IT platform. Further, composite application 130 may run on a heterogeneous IT platform. In doing so, composite application 130 may be cross-functional in that it may drive business processes across different applications, technologies, and organizations. Accordingly, composite application 130 may drive end-to-end business processes across heterogeneous systems or sub-systems. Application 130 may also include or be coupled with a persistence layer and at least one application system connector. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 130, it may instead be a standalone or (relatively) simple software program. Regardless, application 130 may also perform processing automatically, which may indicate that the appropriate processing is substantially performed by at least one component of system 100. It should be understood that this disclosure further contemplates any suitable administrator or other user interaction with application 130 or other components of system 100 without departing from its original scope. Finally, it will be understood that system 100 may utilize or be coupled with various instances of business applications 130. For example, client 104 may run a first business application 130 that is communicably coupled with a second business application 130. Each business application 130 may represent different solutions, versions, or modules available from one or a plurality of software providers or developed in-house.

For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, at least one process associated with application 130 may be stored, referenced, or executed remotely. For example, a portion of application 130 may be a web service that is remotely called, while another portion of application 130 may be an interface object bundled for processing at remote client 104. Moreover, application 130 may be a child or sub-module of another software module or enterprise application (not illustrated) without departing from the scope of this disclosure. Indeed, application 130 may be a hosted solution that allows multiple parties in different portions of the process to perform the respective processing. For example, client 104 may access application 130, once developed, on server 102 or even as a hosted application located over network 112 without departing from the scope of this disclosure. In another example, portions of software application 130 may be developed by the developer working directly at server 102, as well as remotely at client 104. Regardless of the particular implementation, "software" may include software, firmware, wired or programmed hardware, or any combination thereof as appropriate. Indeed, each of the foregoing software applications may be written or described in any appropriate computer language including C, C++, Java, Visual Basic, assembler, Perl, any suitable version of 4GL, as well as others. It will be understood that while these applications are shown as a single multi-tasked module that implements the various features and functionality through various objects, methods, or other processes, each may instead be a distributed application with multiple sub-modules. Further, while illustrated as internal to server 102, at least one process associated with these applications may be stored, referenced, or executed remotely. Moreover, each of these software applications may be a child or sub-module of another software module or enterprise application (not illustrated) without departing from the scope of this disclosure.

Network 112 facilitates wireless or wireline communication between computer server 102 and any other local or remote computer, such as clients 104. Indeed, while illustrated as single network 112, network 112 may be multiple networks without departing from the scope of this disclosure, so long as at least portion of network 112 may facilitate communications between senders and recipients of requests 150 and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include at least one local area network (LAN), radio access network (RAN), metropolitan area network (MAN), wide area networks (WAN), all or a portion of the global computer network known as the Internet, and/or any other communication system or systems at least one location.

Client 104 is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various implementations, each client 104 includes at least GUI 116 and comprises an electronic computing device operable to receive, transmit, process and store any appropriate data associated with system 100. There may be any number of clients 104 communicably coupled to server 102. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via GUI 116. As used in this disclosure, client 104 is intended to encompass a personal computer, touch screen terminal, workstation, network computer, kiosk, wireless data port, wireless or wireline phone, personal data assistant (PDA), at least one processor within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of system 100 for any suitable purpose. Generally, GUI 116 provides the user of client 104 with an efficient and user-friendly presentation of data provided by or communicated within system 100. GUI 116 may provide access to the front-end of business application 130 executing on client 104 that is operable to access at least one business object 145 stored within metadata repository 140. In another example, GUI 116 may display output reports such as summary and detailed reports. GUI 116 may comprise a plurality of customizable frames or views having interactive fields, pull-down lists, and buttons operated by the user. In some implementations, GUI 116 presents information associated with queries 150 and buttons and receives commands from the user of client 104 via one of the input devices. Moreover, the term graphical user interface may be used in the singular or in the plural to describe at least one graphical user interface and each of the displays of a particular graphical user interface. Therefore, GUI 116 contemplates any graphical user interface, such as a generic web browser or touch screen, which processes information in system 100 and efficiently presents the results to the user. Server 102 can accept data from client 104 via the web browser (e.g., Microsoft Internet Explorer or Mozilla Firefox) and return the appropriate HTML or XML responses using network 112. For example, server 102 may receive a request 150 from client 104 using the web browser and then execute the request 150 to store and/or retrieve information and data from a business object 145 stored within metadata repository 140.

In one aspect of operation, the system 100 may assign at least one predefined transformation rule 135 to at least one attribute of the BO 145 during development of a consumer service. For example, the business application 130 may include a request to provide a consumer service to clients 104 and provide access to underlying business objects 145. In connection with generating aspects of a consumer service such as a UI, form, and/or others, the business application 130 may present a plurality of selectable predefined transformation rules 135 available as operators on fields and/or methods of the BO 145. For example, the business application may present a graphical list of selectable rules 135. Based, at least in part, on the selections, the business application 130 may assign the selected rules 135 to the consumer service such that the selected rules 135 are executed when the services is accessed by a client 104.

As for providing the service, the business application 130 receives a request 150 for consumer services. In response to at least the request, the business application 130 identifies at least one BO 145 and at least one transformation rule 135 associated with the requested service. After identifying the appropriate transformation rules 135, the business application 130 identifies at least one field and/or method in the identified BO 145 for transformation and modifies the identified fields and/or methods in accordance with the identified transformation rules 135. The business application 130 incorporates or otherwise includes these modified elements in the consumer services such as in a UI, form, web services, and/or others.

Figure 2:
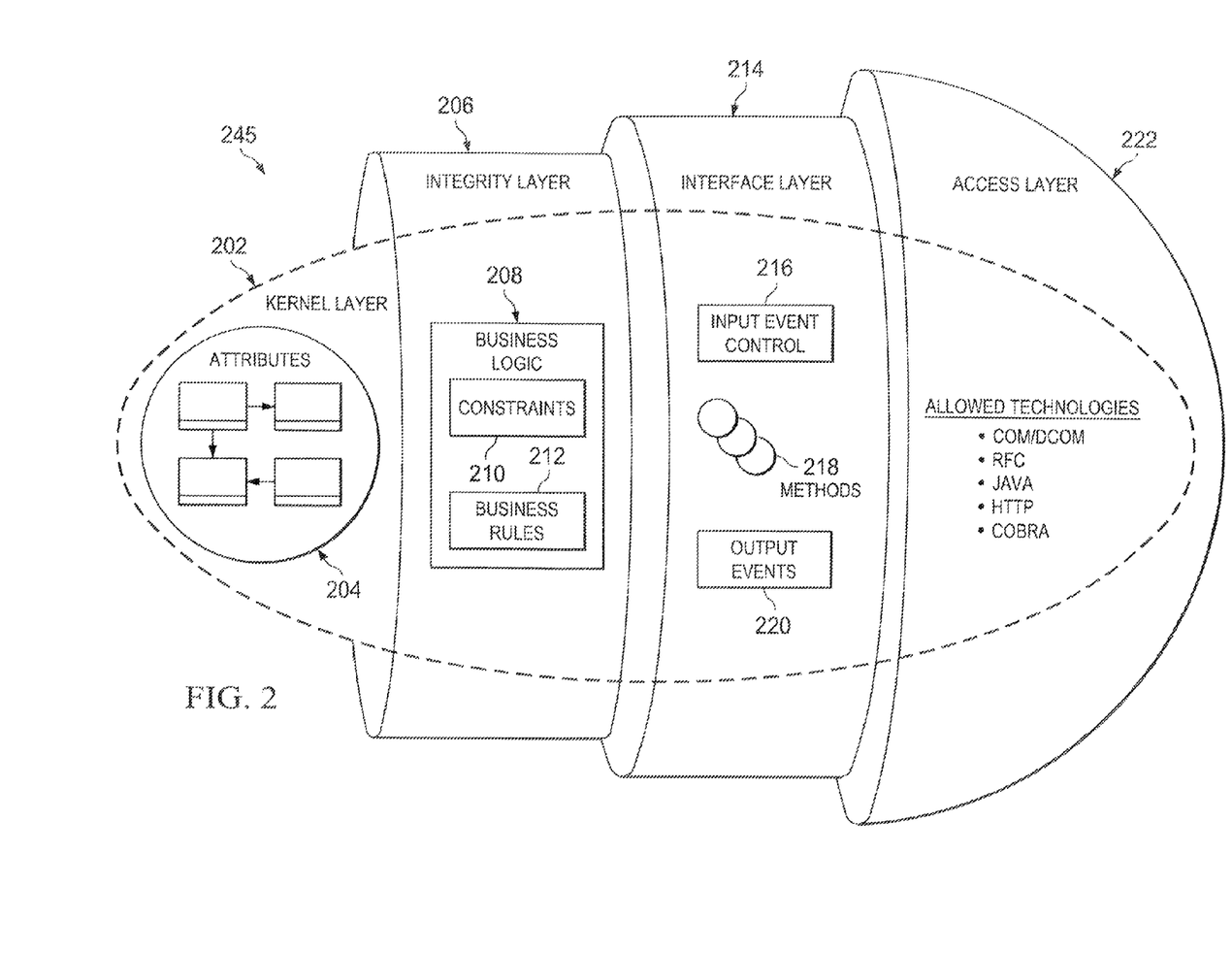
FIG. 2 is a diagram illustrating an example business object.

FIG. 2 illustrates the structure of a generic business object 245 in accordance with some implementations. In general, the overall structure of the business object model may ensure the consistency of the interfaces that are derived from the business object model. The derivation may help ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure). A business object is a capsule with an internal hierarchical structure, behavior offered by its operations, and integrity constraints. These services are typically on business objects, but there can be other use cases without departing from the scope of the disclosure.

Business objects are semantically disjointed, i.e., the same business information is represented once. A business object may be defined such that it contains multiple layers, such as in the example business object 245. The example business object 245 contains four layers: the kernel layer 202, the integrity layer 206, the interface layer 214, and the access layer 222. The innermost layer of the example business object is the kernel layer 202. The kernel layer 202 represents the business object's 245 inherent data, containing various attributes of the defined business object. The second layer represents the integrity layer 206. In the example business object 245, the integrity layer 206 contains the business logic 208 of the object. Such logic may include business rules 212 for consistent embedding in the environment 100 and the constraints 210 regarding the values and domains that apply to the business object 245. Business logic 208 may comprise statements that define or constrain some aspect of the business, such that they are intended to assert business structure or to control or influence the behavior of the business entity. It may pertain to the facts recorded on data and constraints on changes to that data. In effect, business logic 208 may determine what data may, or may not, be recorded in business object 245*a*. The third layer, the interface layer 214, may supply the valid options for accessing the business object 245 and describe the implementation, structure, and interface of the business object to the outside world. To do so, the interface layer 214 may contain methods 218, input event controls 216, and output events 220. The fourth and outermost layer of the business object 245 is the access layer 222. The access layer 222 defines the technologies that may be used for external access to the business object's 245 data. Some examples of allowed technologies may include Local Consumer Proxy (LCP), COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 245 of this instance may implement standard object-oriented technologies such as encapsulation, inheritance, and/or polymorphism.

Figure 3:
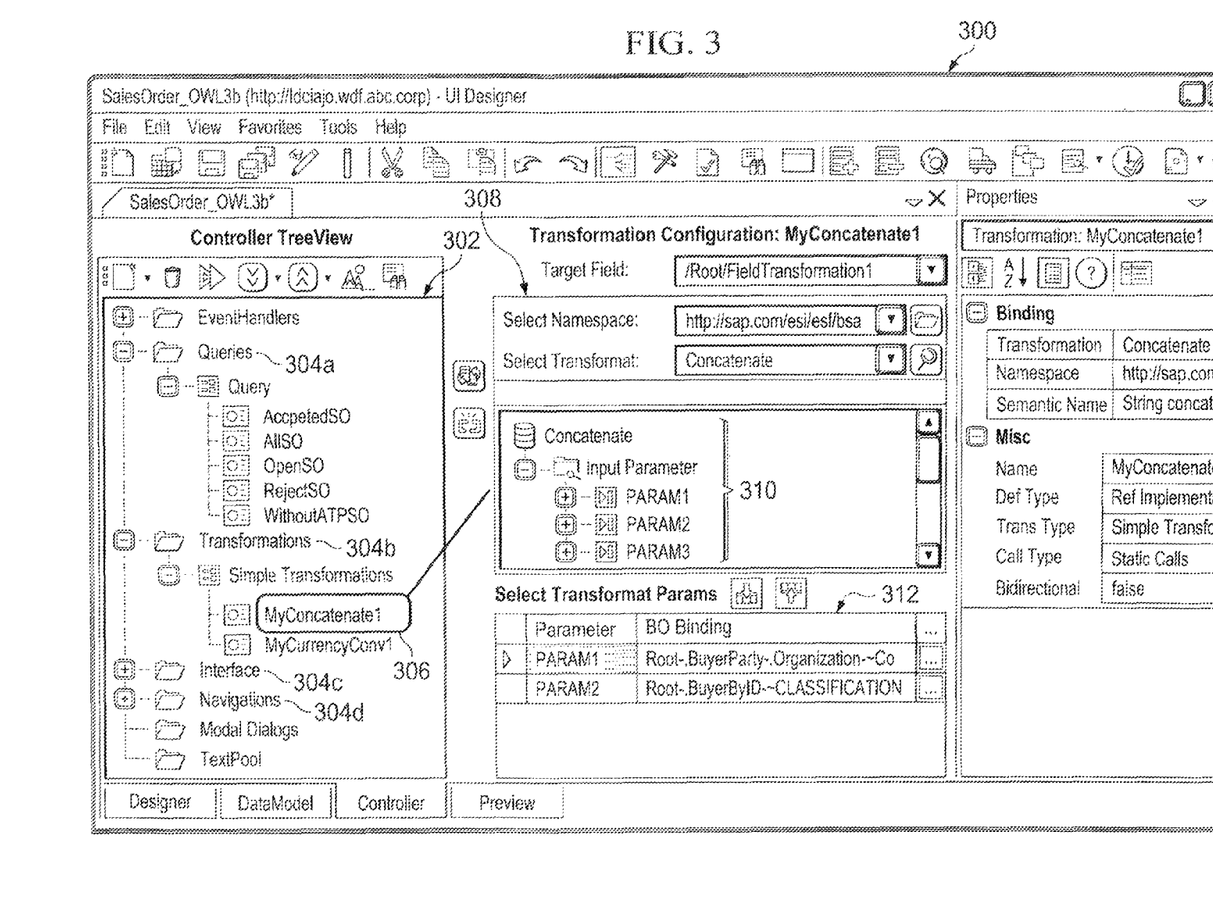
FIG. 3 illustrates an example display for associating predefined transformation rules with services.

FIG. 3 illustrates an example display 300 for assigning or otherwise associating predefined transformation rules to at least one consumer service. For example, the display 300 may be a display of server 102 that enables associating predefined transformation rules 135 to BOs 145 of at least one consumer service. In the illustrated implementation, the display includes a tree view 302 with expandable and collapsible nodes 304*a*-*d*. As illustrated in node 304*b*, a developer may select one of two transformation usages: "MyConcatenate1" and "MyCurrency". In the illustrated example, one of the transformation rules 306 is selected and the details are shown on the right hand side in the display 308. The (single) output service parameter may bind to the service consumer field /Root/FieldTransformation1 (in the middle upper part). The input parameter is shown at 312. In this instance, the tree view 302 includes a queries 304*a* as other development objects in addition to the transformations 304*b* that, when expanded, illustrates a list of transformations bound in this service consumer interface to the user. In connection with a user selection of the concatenate transformation 306, a display 308 is presented that identifies a namespace, the selected transformation, a list of parameters 310, and a list of assigned bindings of the parameter to BO attribute 312 in this concrete usage of the transformation rule. In these implementations, a user may select the input parameters from fields of BOs. The type of transformation is selected in the field "Selected Transformation". This field exposes alternative reusable Transformation rules. Here the transformation "Concatenate" has been selected. In the example, the developer navigates the UI for the development to expose and assign the transformation rules. As an alternative display to visualize/navigate, associating transformation rules may include: originating from the exposure of the service consumer interface; navigating to the service consumer interface detail (here: attribute "/Root/FeldTransformation1"); visualizing the transformation used as detail in a detail screen; and/or others.

Figure 4A:
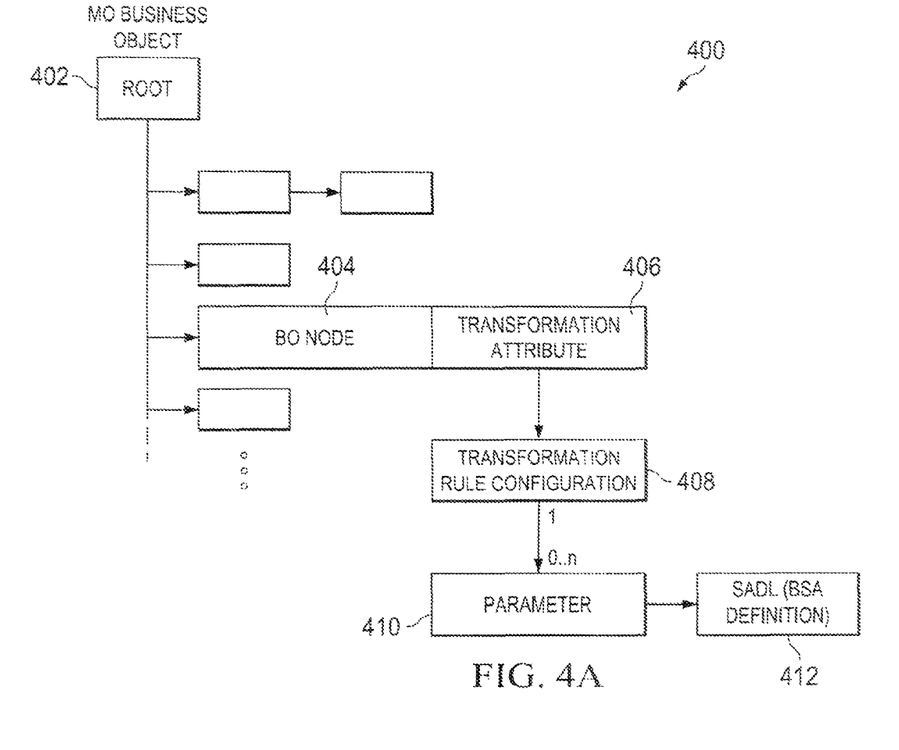
FIGS. 4A-D are schematic diagrams illustrating example methods for executing transformation rules.
Figure 4B:
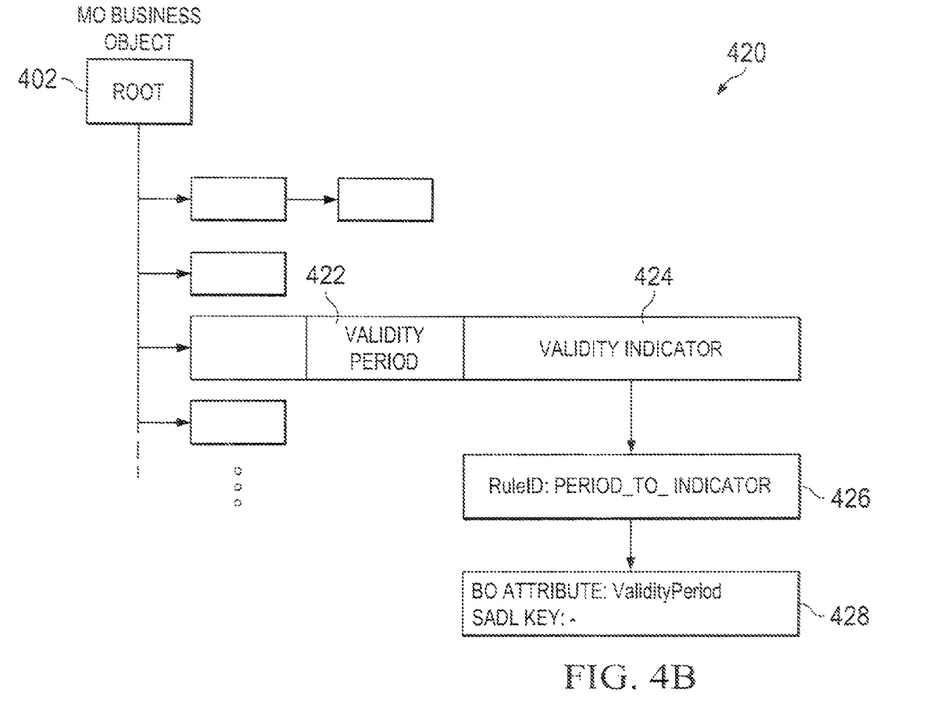
Figure 4C:
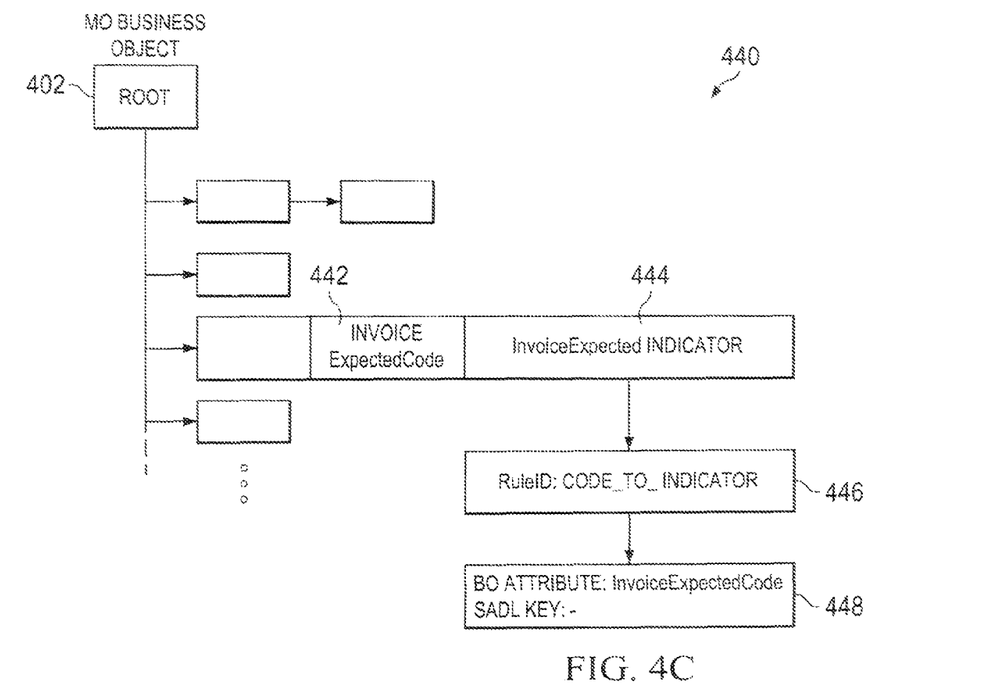
Figure 4D:
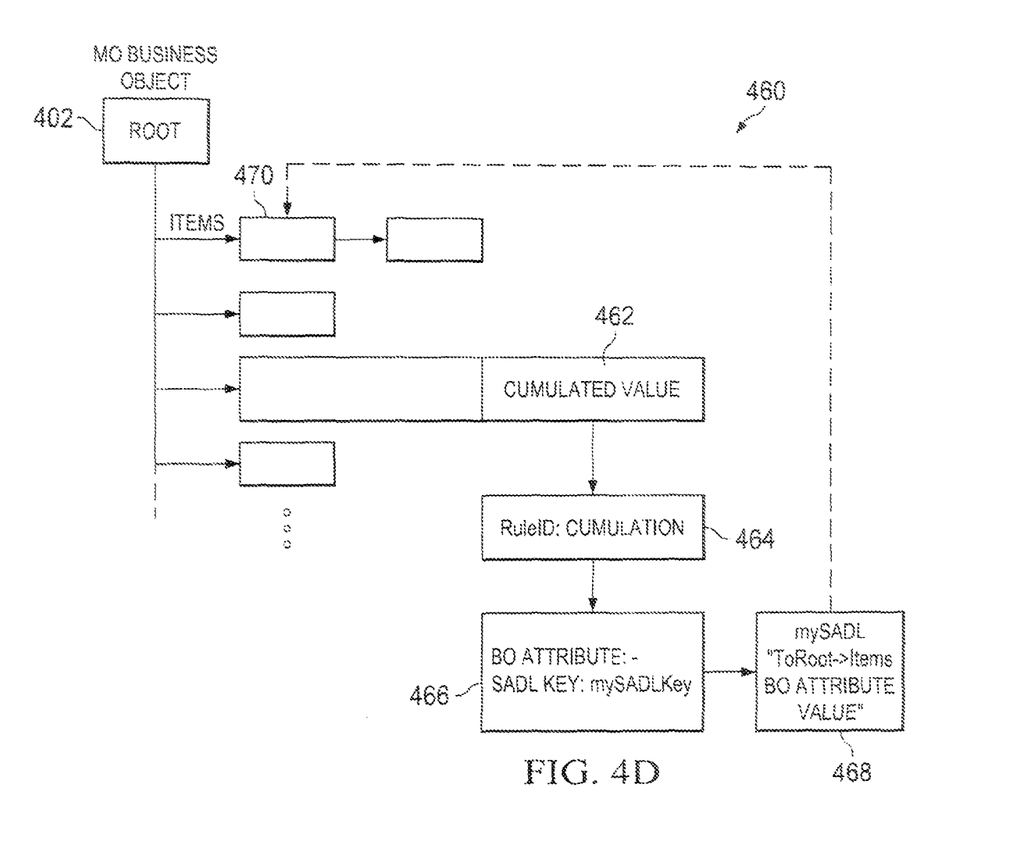

FIGS. 4A-D illustrate schematic diagrams 400, 420, 440 and 460 of predefined transformations rules operating on fields of a business object. Referring to FIG. 4A, diagram 400 illustrates a process of using a mathematical expression to determine a derived attribute of a business object. In particular, the diagram 400 includes a BO root node 402 and a specific node 404. As illustrated, a result 406 of the specific node 404 and a transformation rule 408 are identified. The result 406 is based on the Parameter list 0 . . . n and the rule 408. In these examples, the transformation rule 408 uses parameters specified in the Parameter list 0 . . . n. Those parameters may be bound to other attributes of the BO (not shown in FIG. 4A) as well. Referring to FIG. 4B, the diagram 420 illustrates a process of using a logical expression to determine a derived attribute of the business object. In particular, the diagram 420 illustrates a root node 402 and an attribute 422. In this instance, the attribute 422 of the business object is a validity period and the validity indicator 424 for the consumer service is identified. In addition, the rule 426 for transforming the validity period to the indicator 424 is identified. The rule 426 determines whether the validity period is satisfied and generates the derived attribute 424. Referring to FIG. 4C, diagram 440 illustrates another example process of implementing a logical expression as the transformation rule. In particular, the diagram 440 illustrates a root node 402 and a method 442. In this instance, the method 442 of the business object determines an expected period of an invoice, and the indicator 444 for the consumer service is identified. In addition, the rule 446 for transforming the determined expected invoice date to the indicator 444 is identified. The rule 446 transforms the expected invoice date to the derived attribute 444. Referring to FIG. 4D, diagram 460 illustrates a process of determining a derived attribute and using the derived attribute as a value in the root node 402. This use case may be used to derive a cumulated value on the root level on at least item. For example, the total sum of all item values of a sales order may be derived from the individual values of the items. In particular, the cumulated value 462 and the rule 464 are identified. The rule 464 is applied to derive the attribute 466. The transformation rules binds via the navigation path "ToRoot->Items" to the item node in 470 in the BO model. That is, all items of a sales order will be used to derive the cumulated value in the transformation rule 464.

Figure 5:
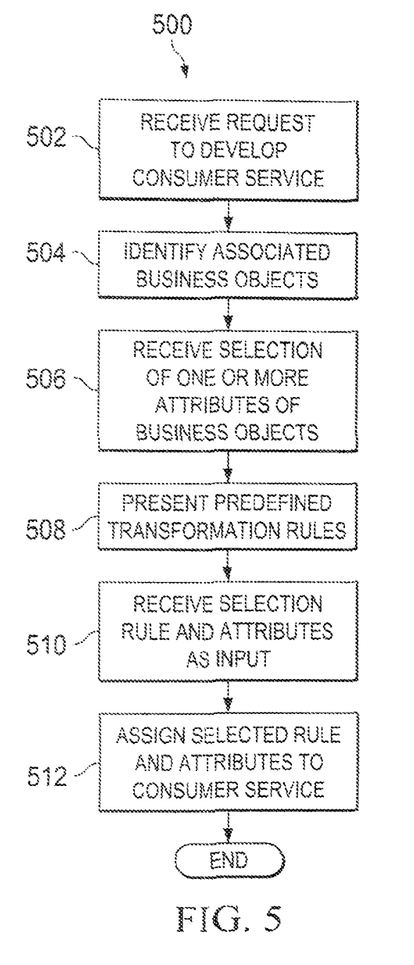
FIG. 5 is a flow chart illustrating an example method for associating predefined transformation rules with services.
Figure 6:
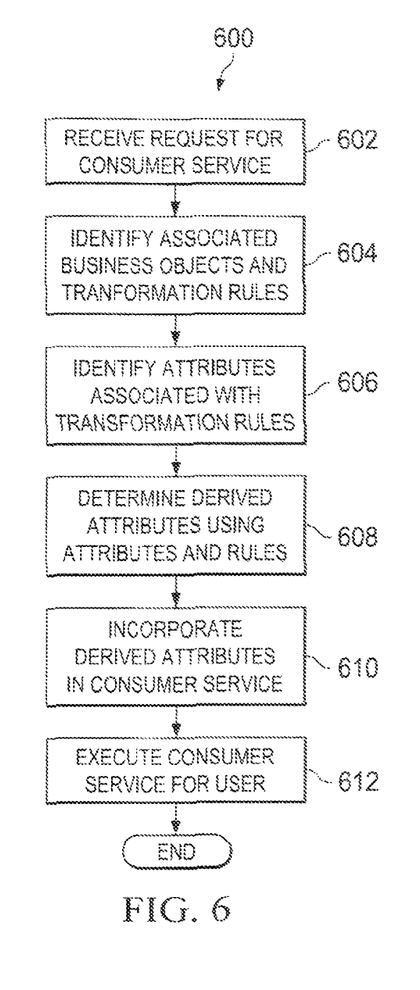
FIG. 6 is a flow chart illustrating an example method for executing a predefined transformation rule.

FIGS. 5 and 6 are flowcharts illustrating an example method 500 for associating predefined transformation rules to consumer services and an example method 600 executing the services using the rules, respectively. Methods 500 and 600 are described with respect to system 100 of FIG. 1. Though, system 100 contemplates using or implementing any suitable technique for performing these and other tasks. These methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate. In addition, while methods 500 and 600 are described with respect to business objects 145, the methods 500 and 600 may apply to business services with or without business objects.

Referring to FIG. 5, method 500 begins at step 502 where a request to develop a consumer service is received. For example, the server 102 of FIG. 1 may receive a request from a user to develop a consumer service such as a UI, web service, form, and/or other service. At step 504, business objects associates with the consumer service are identified. In the example, the business application 130 may identify at least one business object 145 that is associated with the consumer service being developed. Next, at step 506, a selection of at least one attribute of the identified business objects is received. Again in the example, the business application 130 may receive a selection through, for example, a GUI of the server 102 that identifies at least one attribute associated with the consumer service. The predefined transformation rules are presented to the developer at step 508. As for the example, the business application 130 may present the predefined transformation rules 135 to the developer for selection. At step 510, a selection of a rule and at least one attribute as input to the rule are received. Returning to the example, the business application 130 may receive a selection of a predefined business rule 135 and at least attribute of at least one business object 145. Next, at step 512, the selected rule and attribute inputs are assigned to the consumer service. As for the example, the business application 130 may assign the selected rule 135 and attributes to the consumer service and store the assignment in metadata repository 140.

Referring to FIG. 6, method 600 begins at step 602 where a request for consumer services is received. Again returning to the example, the business application 130 may receive a request from a client 104 for a consumer service. At step 504, business objects and transformation rules associated with the requested service are identified. In the example, the business application 130 may determine business objects 145 and transformation rules 135 associated with the request consumer service. Next, at step 506, attributes of the business objects that are input to the identified transformation rule are identified. As for the example, the business application 130 may identify attributes of the business objects 145 that are inputs for the identified transformation rules 135. Derived attributes of the business objects 145 are determined using the identified attributes and the rules at step 508. Yet again in the example, the business application 130 may compute derived attributes by solving expressions included in the rules 135 using the identified attributes. At step 510, the derived attributes are incorporate in a consumer service. In the example, the business application 130 may populate a UI or form with the derived attributes. Next, at step 512, the consumer service is executed.

Although this disclosure has been described in terms of certain implementations and generally associated methods, alterations and permutations of these implementations and methods will be apparent to those skilled in the art. Accordingly, the above description of example implementations does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer-implemented method performed by at least one processor, the method comprising the following operations:
  receiving a request to develop a consumer service;
  presenting a plurality of predefined transformation rules;
  receiving a selection to assign a predefined transformation rule from the plurality of predefined transformation rules to the one or more attributes;
  presenting a plurality of different technologies compatible with the predefined transformation rule;
  receiving a selection of a specific technology from the plurality of different technologies presented to the consumer;
  presenting attributes of business objects associated with the specific technology;
  receiving a selection of one or more attributes of the business objects;
  assigning the predefined transformation rule to a portion of the consumer service compatible with the specific technology, wherein the portion comprises the one or more attributes of the business objects;

when a user accesses the consumer service, determining a data value based on the predefined transformation rule operating on the one or more attributes of the business objects, and the data value is generated independent of modifying the one or more attributes of the business objects, the data value provides comprehensible information to users;

receiving a request to identify a transformation rule assigned to the transformed portion of the service;

identifying the predefined transformation rule and the specific technology in response to at least the request;

identifying at least one service different from the consumer service dependent on the transformed portion of the service; and presenting the dependencies of the at least one different consumer service to a user to identify a where-used list.

2. The method of claim 1, the predefined transformation rule configured to transform the service during execution.

3. The method of claim 1, further comprising assigning the predefined transformation rule to each of a plurality of different services.

4. The method of claim 1, further comprising reversing execution of the predefined transformation rule to parameters of the business object from parameters bound to the consumer service.

5. A non-transitory medium comprising a computer program product, the computer program product comprising computer readable instructions for causing at least one processor to perform operations comprising:

receiving a request to develop a consumer service;

presenting a plurality of predefined transformation rules;

receiving a selection to assign a predefined transformation rule from the plurality of predefined transformation rules to the one or more attributes;

presenting a plurality of different technologies compatible with the predefined transformation rule;

receiving a selection of a specific technology from the plurality of different technologies presented to the consumer;

presenting attributes of business objects associated with the specific technology;

receiving a selection of one or more attributes of the business objects;

assigning the predefined transformation rule to a portion of the consumer service compatible with the specific technology, wherein the portion comprises the one or more attributes of the business objects;

when a user accesses the consumer service, determining a data value based on the predefined transformation rule operating on the one or more attributes of the business objects, and the data value is generated independent of modifying the one or more attributes of the business objects, the data value provides comprehensible information to users;

receiving a request to identify a transformation rule assigned to the transformed portion of the service;

identifying the predefined transformation rule and the specific technology in response to at least the request;

identifying at least one service different from the consumer service dependent on the transformed portion of the service; and presenting the dependencies of the at least one different consumer service to a user to identify a where-used list.

6. The non-transitory medium of claim 5, the predefined transformation rule configured to transform the service during execution.

7. The non-transitory medium of claim 5, further comprising assigning the predefined transformation rule to each of a plurality of different services.

8. The non-transitory medium of claim 5, further comprising reversing execution of the predefined transformation rule to parameters of the business object from parameters bound to the consumer service.

9. A system comprising:

memory for storing a set of objects associated with the system; and at least one processor that:

receives a request to develop a consumer service;

presents a plurality of predefined transformation rules;

receives a selection to assign a predefined transformation rule from the plurality of predefined transformation rules to the one or more attributes;

presents a plurality of different technologies compatible with the predefined transformation rule;

receives a selection of a specific technology from the plurality of different technologies presented to the consumer;

presents attributes of business objects associated with the specific technology;

receives a selection of one or more attributes of the business objects;

assigns the predefined transformation rule to a portion of the consumer service compatible with the specific technology, wherein the portion comprises the one or more attributes of the business objects;

when a user accesses the consumer service, determines a data value based on the predefined transformation rule operating on the one or more attributes of the business objects, and the data value is generated independent of modifying the one or more attributes of the business objects, the data value provides comprehensible information to users;

receives a request to identify a transformation rule assigned to the transformed portion of the service;

identifies the predefined transformation rule and the specific technology in response to at least the request;

identifies at least one service different from the consumer service dependent on the transformed portion of the service; and presents the dependencies of the at least one different consumer service to a user to identify a where-used list.

10. The system of claim 9, the at least one processor that further reverses execution of the predefined transformation rule to parameters of the business object from parameters bound to the consumer service.

* * * * *